United States Patent
Wivagg

(10) Patent No.: US 6,726,140 B2
(45) Date of Patent: Apr. 27, 2004

(54) TAKE-UP REEL FOR FLEXIBLE ELONGATED MEMBERS

(75) Inventor: Adrian P. Wivagg, Tolland, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 133 days.

(21) Appl. No.: 09/755,244

(22) Filed: Jan. 5, 2001

(65) Prior Publication Data

US 2003/0178520 A1 Sep. 25, 2003

(51) Int. Cl.[7] .............................................. B65H 75/48
(52) U.S. Cl. .................................. 242/378.2; 242/378.1
(58) Field of Search ............................ 242/378.2, 378, 242/378.1, 378.3; 114/254

(56) References Cited

U.S. PATENT DOCUMENTS

| | | | | |
|---|---|---|---|---|
| 840,200 | A | * 1/1907 | Craft | 242/378 |
| 1,782,669 | A | * 11/1930 | Turner | 242/378 |
| 1,868,409 | A | * 7/1932 | Crispen | 242/378.2 |
| 2,219,201 | A | * 10/1940 | Smith | 242/378.2 |
| 2,438,515 | A | * 3/1948 | Mohler | 242/378 |
| 2,518,071 | A | * 8/1950 | Rushworth | 242/378 |
| 3,061,234 | A | * 10/1962 | Morey | 242/378.2 |
| 3,106,368 | A | * 10/1963 | Tait et al. | 242/378 |
| 3,224,706 | A | * 12/1965 | Bastow | 242/378 |
| 3,409,246 | A | * 11/1968 | De Pas | 242/378.2 |
| 3,545,693 | A | * 12/1970 | Gurner | 242/54 |
| 3,648,642 | A | * 3/1972 | Fetrow et al. | 114/245 |
| 3,895,764 | A | * 7/1975 | Roland | 242/107.6 |
| 3,959,608 | A | * 5/1976 | Finlayson et al. | 242/378 |
| 3,961,589 | A | * 6/1976 | Lombardi | 114/328 |
| 4,008,791 | A | * 2/1977 | Shafii-Kahany et al. | 191/12.2 R |
| 4,010,913 | A | * 3/1977 | Guerster et al. | 242/378 |
| 4,384,688 | A | | 5/1983 | Smith |
| 4,813,627 | A | | 3/1989 | Nelson |
| 4,903,911 | A | | 2/1990 | Sepka |
| 5,022,600 | A | * 6/1991 | Blanc et al. | 242/107 |
| 5,332,171 | A | * 7/1994 | Steff | 242/378 |
| 5,402,814 | A | | 4/1995 | Odom |
| 5,495,995 | A | | 3/1996 | Dominique et al. |
| 5,520,212 | A | | 5/1996 | Williams |
| 5,666,992 | A | | 9/1997 | Robins |
| 5,732,733 | A | | 3/1998 | Negus et al. |
| 6,199,784 | B1 | * 3/2001 | Wang et al. | 242/378 |

OTHER PUBLICATIONS

Product Brochure (The Reel Catalog) by Reelcraft Industries, Inc., (4/97).

* cited by examiner

*Primary Examiner*—Donald P Walsh
*Assistant Examiner*—Daniel K Schlak

(57) ABSTRACT

Apparatus for delivering energy and material, such as electricity, air and fluid, from a source (22) to a driven device (24). The apparatus (20) comprises at least one flexible elongated member (26) selected from the group of electrical conductors, air hoses, fluid hoses and the like. The elongated member has a feed portion (114) with a feed end (42) connectable to the source, a slack portion (118), a supply portion (120) with a supply end (43) connectable to the driven device, a first portion (128) between the feed portion and the slack portion, and a second portion (134) between the slack portion and the supply portion. The apparatus also includes a stationary hub (74) and a spool (78) connected to the hub. The spool is rotatable between stored and deployed conditions relative to said hub. A winding wall (82) on the spool is spaced away from the hub and has an internal surface (86), an oppositely disposed winding surface (88), and an aperture (90) extending therethrough. A storage compartment (112) is positioned between the hub and the internal surface. A first clamp (101) on the hub fixes the first portion of the elongated member relative to the hub, positions the supply portion to extend away from the reel, and positions the slack portion to extend into the storage compartment. A second clamp (132) on the spool fixes the second portion relative to the spool and positions the supply portion to extend through the aperture.

9 Claims, 4 Drawing Sheets

TAKE-UP REEL FOR FLEXIBLE ELONGATED MEMBERS

BACKGROUND

Flexible elongated members that are used to transmit material or energy, such as air hoses, water hoses, electric cords and the like, are frequently coiled onto on winding reels. In a simple application, the elongated member is wound onto the reel for storage and then completely unwound and removed from the reel for use. On such a reel, a free end of the elongated member is grasped and pulled to rotate the reel and unwind the elongated member. During unwinding, the opposite end of the elongated member can be captured against the winding surface of the reel by the outer coils and will rotate along with the reel. Since the captured end is both confined and moving, it can be difficult or impossible to connect this end to a source of material or energy while the elongated member is on the reel. Thus, the elongated member cannot be utilized while installed on the reel.

In some applications it can be advantageous to connect the captured end of the elongated member to a source of material or energy without having to completely remove the member from the reel. For example, if an air compressor can be connected to the captured end of an air hose installed on a reel, and in a manner that accommodates the rotation of the reel, then the air hose can be utilized without having to completely remove the hose from the reel. Instead, the operator can merely unwind the desired length of the hose from the reel and connect the free end a pneumatically powered device. This type of arrangement facilitates the controlled and orderly use of the air hose, since the operator does not have to deal with its full and unconstrained length, and two free ends, in order to utilize the hose.

Such a reel must include a means for placing the captured end of the air hose in communication with the air compressor that compensates for the rotation of the reel. For example a fitting on the captured end can be connected to a corresponding fitting incorporated into the reel's axle, which in turn is connected to another air hose leading to a compressor. The fittings can include couplings employing o-rings or the like which will accommodate the rotation of the reel so as to avoid twisting and binding the air hose running to the compressor. However, such fittings can provide a leak path for the air, a problem which can be exacerbated by the wear and tear on the moving parts.

Additionally, the use of the confined area defined by the axle for a connection point tends to have a limiting effect on the number of air hoses that can be used while installed on the reel. This can be a disadvantage when a device requires inputs from multiple air lines, and particularly so when the operating environment lends itself to the difficulty of handling the multiple air lines. For example, the operation of the device disclosed in U.S. Pat. No. 6,047,037 to Wivagg, entitled Multi-Lift Tool and Method for Moving Control Rods in a Nuclear Reactor, can involve the use of multiple air lines to power a tool in a difficult environment.

This tool can be lowered into a pool of water in an area of a nuclear reactor exposed to radiation, and can require as many as eight air lines to operate. Preferably a single reel would be used to handle the entire complement of air lines needed. However, since most prior art reels will not handle the required number of air lines, multiple reels must be used. This is undesirable because operators of the equipment will generally prefer to minimize the number of objects adjacent the pool of water to reduce the potential for accidents and to minimize the number of objects that may be in need of special handling due to radiation exposure. In addition, when the air lines are retracted from the pool they can disperse water that has been exposed to radiation into the work environment, an undesirable event which can be aggravated by the use of multiple reels scattered around the work area.

SUMMARY

Apparatus is provided for delivering energy and material, such as electricity, air and fluid, from a source to a driven device. The apparatus comprises at least one flexible elongated member selected from the group of electrical conductors, air hoses, fluid hoses and the like. The elongated member has a feed portion with a feed end connectable to the source, a slack portion, a supply portion with a supply end connectable to the driven device, a first portion between the feed portion and the slack portion, and a second portion between the slack portion and the supply portion. If desired, the elongated member can comprise multiple conduits.

A reel is provided with a stationary hub and a spool connected to the hub, the spool being rotatable relative to the hub between stored and deployed conditions. A winding wall on the spool is spaced away from the hub and has an internal surface, an oppositely disposed winding surface, and an aperture extending therethrough. A storage compartment is positioned between the hub and the internal surface. A first clamp on the hub fixes the first portion of the elongated member in place relative to the hub, positions the supply portion to extend away from the reel, and positions the slack portion to extend into the storage compartment. A second clamp on the spool fixes the second portion relative to the spool and positions the supply portion to extend through the aperture.

When the elongated member is on the apparatus with the spool in the stored condition, the feed portion can extend to and be connected to the source, the slack portion is positioned in the storage compartment, and the supply portion is wound onto the winding surface. When the spool is rotated to the deployed condition, the feed portion can remain connected to the source without twisting, the slack portion partially tightens around the hub while remaining in the storage compartment to accommodate the rotation of the spool, and at least a part of the supply portion unwinds from the winding surface a sufficient distance to connect the supply end to the driven device.

The apparatus can also include a force means for moving the spool between the deployed and the stored conditions. The force means can be a device such as a spring motor that stores spring energy when the spool is moved from the stored condition to the deployed condition, and releases spring energy when the spool is moved from the deployed condition to the stored condition.

The reel can include an upper portion containing a recess therein for removably connecting the apparatus to an adjacent structure, and the recess can comprise surfaces on wheels that engage a complementary surface on the adjacent structure. The reel can also include a lower portion with a bumper that engages the adjacent structure, and a moveable member for adjusting a distance between the recess and the bumper.

DETAILED DESCRIPTION

Figure 1:
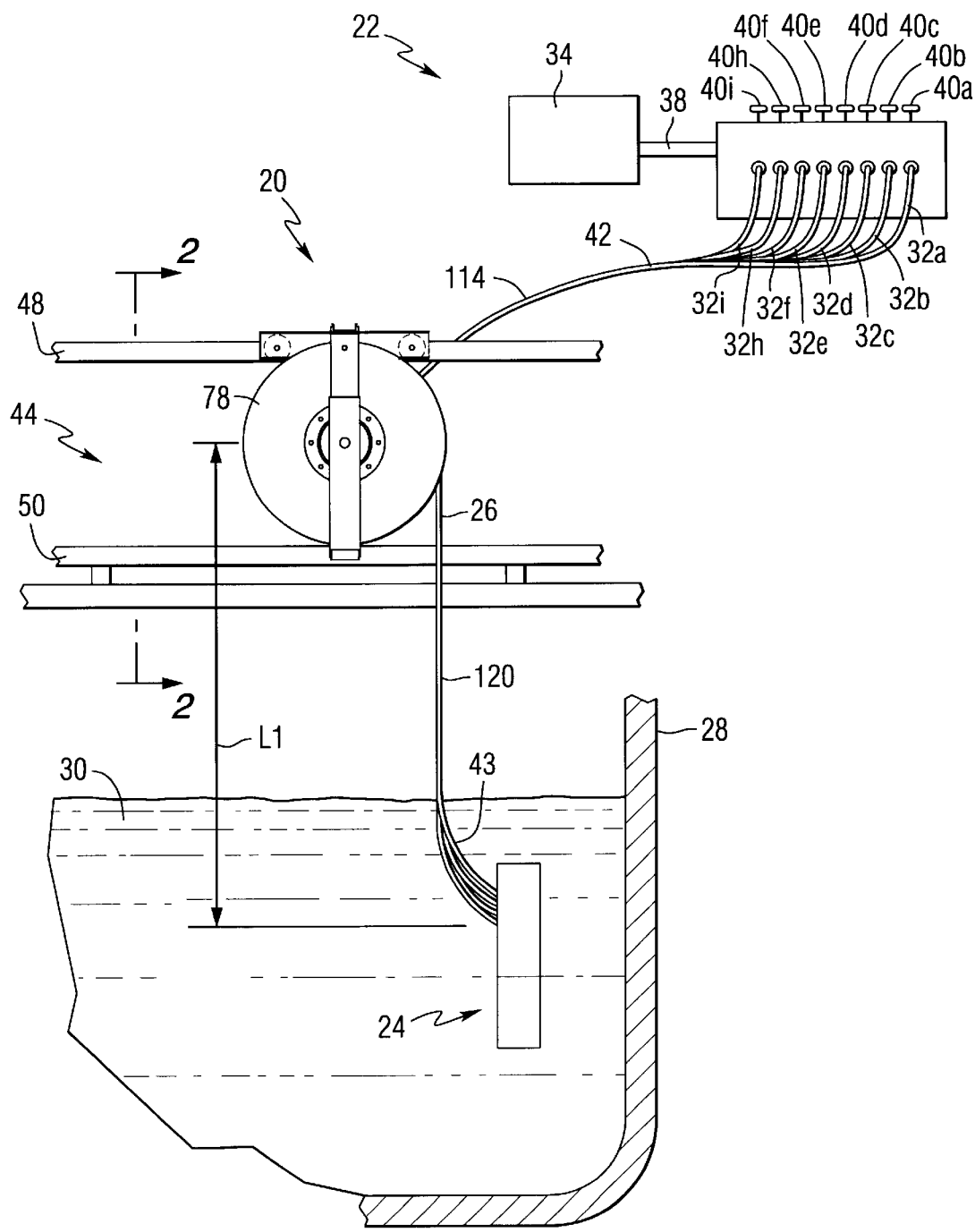
FIG. 1 is a front view, partially fragmented, showing a reel apparatus handling multiple air-lines used to operate a pneumatic tool immersed in a pool of water.

FIG. 1 depicts an example of a reel apparatus (20) that can be used to deliver energy and material, such as electricity, air, fluid and the like, from a source (22) to a driven device (24). The source (20) can be, for example, an electric generator, battery, air compressor, water pump and the like. The driven device can be any type of device that is driven by or responsive to the given type of input.

A flexible elongated member (26) is installed on the apparatus (20) and is used to transmit the energy or material from the source to the driven device. The type of elongated member used will vary according to the type of the source and the driven device used in a given application, and can include electric cables, air hoses, water hoses, and the like.

In the example shown in FIG. 1, the driven device (24) can be placed in a container or vessel (28) that is filled with water (30). A device such as a crane or hoist (not shown) can be used to lower the tool into the container and position the tool at a desired depth and location. Such an arrangement can be found in nuclear reactors, where the vessel is filled with water near the core (not shown) to minimize levels of radiation that may be imparted to workers and equipment. Such a tool can be air-operated and may require multiple pneumatic inputs, and if so, the elongated member (26) can comprise multiple conduits or air lines (32a–32i) that are integrally formed with one another in a side-by-side fashion to provide a flat ribbon air-hose of types known to skilled artisans. An example of a material that can be used with air-hoses utilized in this apparatus is polyurethane.

The source can comprise an air compressor (34) and a controller (36) of types known to skilled artisans, and the compressor feeds pressurized air to the controller via a pneumatic connection (38). The controller includes eight valves operated by handles (40a–40i), each of which can be used to control the pneumatic input to one of the air lines (32a–32i). If necessary, the air-lines can be separated from each other at the feed end (42) of the elongated member in order to accommodate the geometry of the controller (36), and they may also be separated from each other at their supply end (43) in order to accommodate the geometry of the pneumatic tool (24).

The nuclear reactor often includes a walkway (44) or other structure adjacent and or above the pool of water. The walkway can include an upper hand rail (48) and a lower foot rail (50). The reel apparatus can be connected to the rails (48) and (50) when in use so as to avoid the need of placing the reel apparatus in areas where operators will need to walk.

Figure 2:
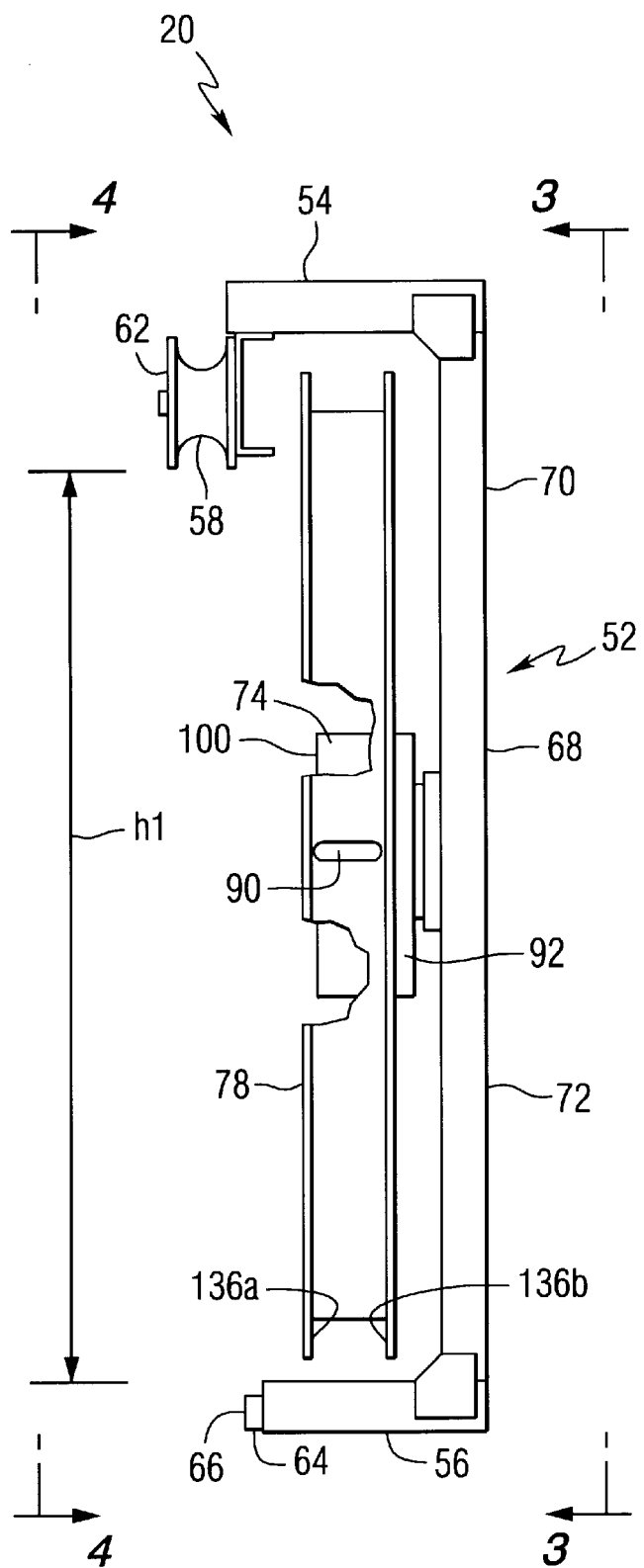
FIG. 2 is a side view of the reel shown in FIG. 1.

As shown in FIG. 2, the reel apparatus (20) has frame (52) with an upper portion (54) and a lower portion (56). The upper portion includes a recess (58) for removably connecting the apparatus to the hand rail. In some applications the need may arise to move the reel apparatus (20) to different positions along the length of the rail (46). If so, then to facilitate this movement, the recess can be provided on one or more wheels (62), which are sized to fit over and on top of the hand rail (48). The lower portion (56) of the frame (52) may include a bumper (64) positioned to engage and rest against the foot rail (50). If desired, the bumper can comprise a wheel with a rolling surface (66) to facilitate movement of the apparatus along the length of the rail.

The frame (52) can include a member (68) that connects the upper portion (54) to the lower portion (56). The member (68) can have an upper channel (70) and a lower channel (72). The positions of these channels can be moved relative to each other in a telescopic fashion in order to permit variations of the distance (h1) between the recess (58) and the bumper (64). Thus, the connecting member is adjustable to accommodate various configurations of different protective rails. Once the distance L1 is the desired length, the channels can be secured to each other using various types of fasteners known to those skilled in the art.

The reel apparatus (20) includes a stationary hub (74) with a first end (76) connected to the frame (52), and a spool (78) that is rotatably connected to the hub. The spool has a plate member (80) and a winding wall (82). The winding wall (82) is spaced way from the hub and can have an internal surface (86) and an oppositely positioned winding surface (88). An aperture (90) extends through the winding wall from the winding surface to the internal surface.

Figure 3:
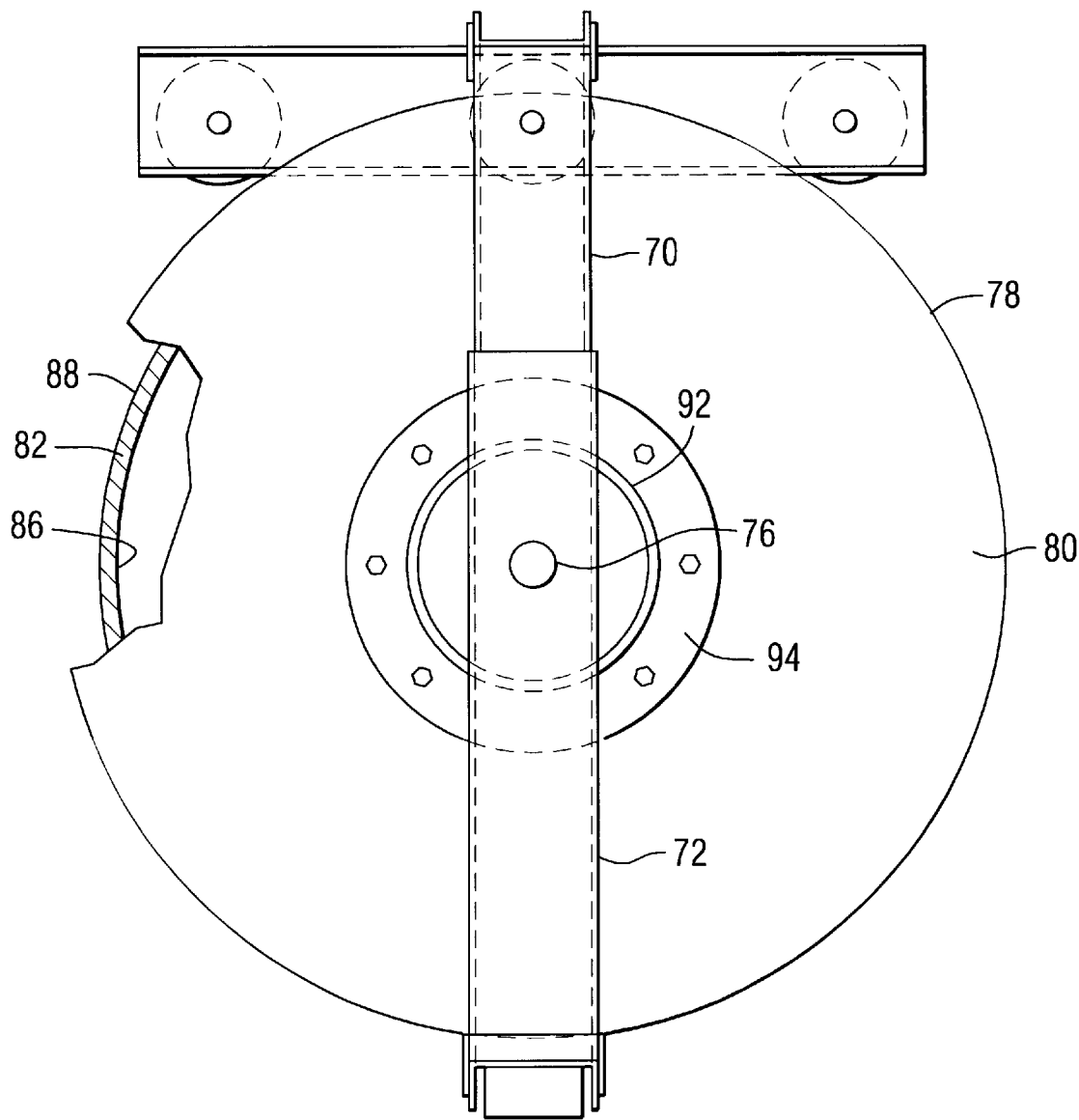
FIG. 3 is a front view of the reel, taken along section lines 3—3 in FIG. 2.

The spool can be rotatably connected to the hub by various means known to skilled artisans. These means can include force generators such as electric or spring powered motors that may be utilized to rotate the spool in one or both directions. FIG. 3 shows the use of a spring powered motor (92) with a flange (94) that is connected to an outer surface (96) of the spool's plate member (80). This type of motor can store spring energy when the spool is rotated in one direction, and will release the spring energy when the spool is rotated in the opposite direction.

Figure 4:
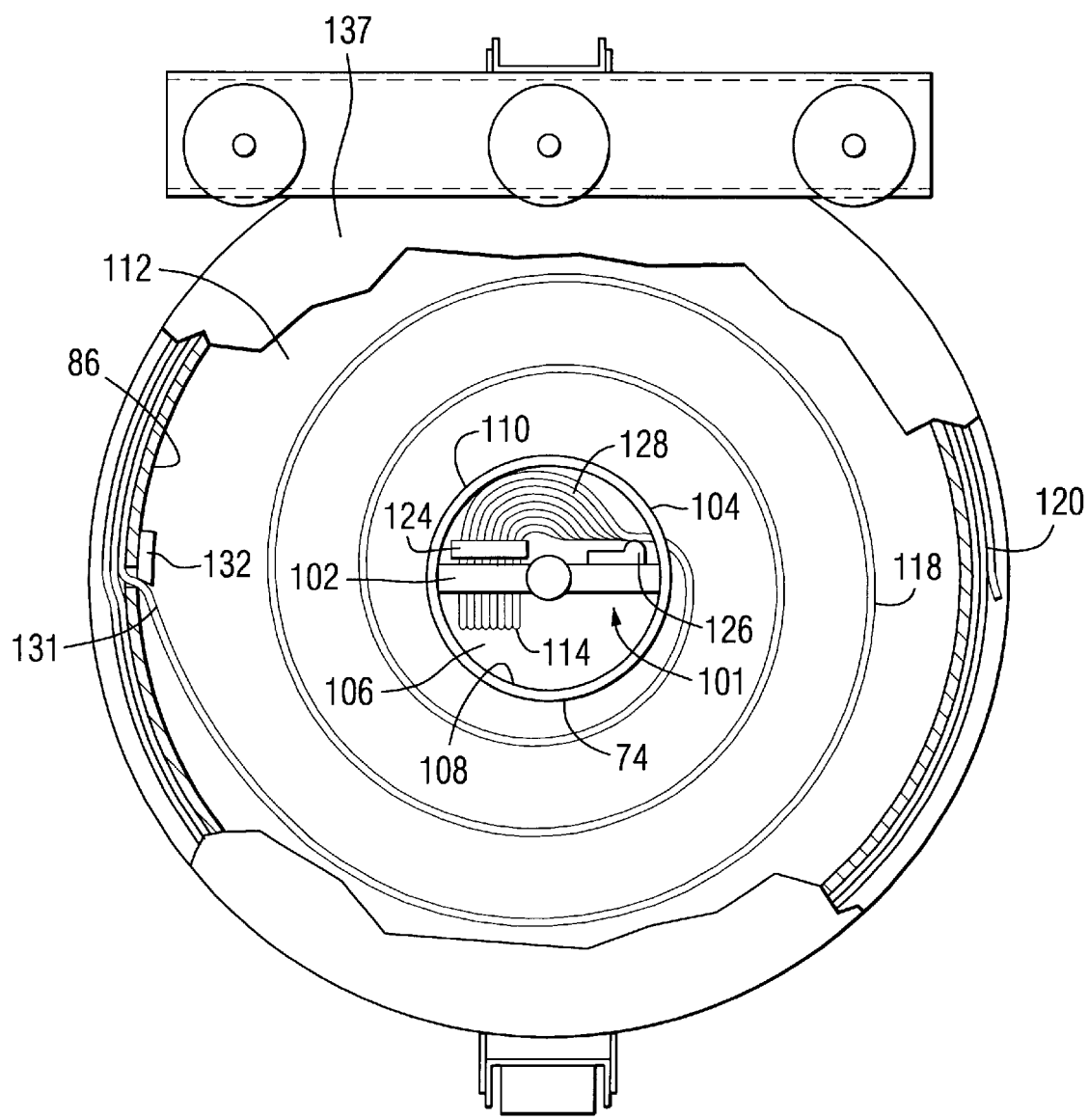
FIG. 4 is a back view of the reel, taken along section lines 4—4 in FIG. 2.

The hub (74) can extend from the first end (76) through the spring motor to a second end (100). As seen in FIG. 4, the second end includes a clamp (101) with a crossbar (102) holding an outer ring (104). The outer ring includes an inner surface (108) that defines an inner compartment (106). The outer ring has an external surface (110) spaced away from and facing the internal surface (86) on the winding wall (82). The external surface on the hub and the internal surface on the winding wall define an annular storage compartment (112).

An elongated member or air hose (26), when used in this apparatus, can include a feed portion (114) extending to feed end (42) that is connectable to the source (as shown in FIG. 1), a slack portion (118) that resides in the storage chamber (112), and a supply portion (120) with supply end (43) connectable to the driven device. FIG. 4 shows the reel apparatus with the spool in a stored condition, with the supply length (120) stowed as multiple wraps or coils on the winding surface (88).

The clamp (101) can include a first clamp member (124) and a second clamp member (126) connected to the crossbar (102). A portion (128) of the air hose residing between the feed portion (114) and the slack portion (118) is fixed in place in the inner compartment of the hub by these members. The portion (128) extends over and bears against the first clamp member (124) and extends under and bears against the crossbar (102). This arrangement holds the air hose portion (128) away from the rotatable plate member (80), and also bends the hose so that the supply portion to extend away from the reel apparatus for connection to the source. The air hose portion (128) also passes around the second clamp member (126) and through a passage in ring (104). This arrangement of the air hose within the inner compartment serves to fix the air hose portion (128) and the adjacent portion of the supply length in place relative to the hub, and also causes the slack portion to extend into the storage compartment (112).

The slack portion (118) can be coiled around the hub (100) in the direction shown within the storage compartment (112), and exits the storage compartment through aperture (90) in winding wall (82). The spool has a clamp (132) connected to the plate member (80) adjacent the aperture. The clamp bears against a portion (134) of the air hose residing between the slack portion and the supply portion to fix the portion (134) in place relative to the spool and to position the supply portion to extend through the aperture (90) in the winding wall (82).

It should be noted that the clamps used in the hub and on the spool operate primarily by friction, in that as the air hose bends around the clamps sufficient frictional forces are developed to fix the affected portion of the air hose in place. An advantage of using this type of clamp arrangement facilitates the operable use of the air hose while it is installed on the reel apparatus, since the clamps do not cause the air hose to kink, crimp, or bend to the point that air flow between the source and the driven device is interrupted. However, other types of clamping arrangements known to skilled artisans may be used, provided they do not exert such a level of force that they damage the hose or close off the air flow in the hose.

The supply portion is coiled onto the winding surface (88) in the same direction that the slack portion is coiled around the hub. The winding wall (82) includes a pair of channel walls (136a) and (136b) or other suitable means know to skilled artisans for retaining the air hose on the winding surface. A cover (137) can be installed on channel wall (136a) to retain the slack portion in the storage compartment. The cover could be, for example, a sheet of Plexiglas or one or more beams extending from one side of the spool to the other.

Having described the apparatus, its use will now be explained.

The air hose can be installed onto the reel as shown in FIG. 4, which depicts the air hose in a stored condition. In the stored condition, the supply portion (120) is coiled or wrapped onto the winding surface. The necessary length of the supply portion is predetermined and can be based upon an estimate of the expected maximum distance that the reel apparatus will be portioned from a driven device. For example, FIG. 1 depicts a distance (L1) between the reel apparatus (20) and the driven device (24), which in some applications could, for example, measure seventy feet.

The number of wraps or coils that the supply portion (120) will make on the winding surface (88) is determined based upon the length of the supply portion and the diameter of the winding surface. For example, the winding surface diameter can be about fifty inches, and if so a seventy foot length of the supply portion (120) will need to make about six overlapping coils or wraps on the winding surface. Thus, the spool will have to make six complete turns in order to feed out the entire length of the supply portion (120).

The length of the slack portion (118) can be determined based upon the number of turns that the spool (78) will have to make to feed out the entire length of the supply portion, and the difference between the winding surface diameter and the outer ring (104). The slack portion (118) will be begin tightening around the hub as the feed portion is uncoiled from the winding surface, and should be long enough to avoid being tightened to the point that the hose is compressed and cuts of the air flow. For example, if the outer ring (104) has a diameter of about 7 inches, then the length of the slack portion (118) can be approximately 25 feet, provided the supply portion length and winding surface diameter are about seventy feet and about fifty inches, respectively.

With the necessary lengths of the supply portion and the slack portion established, the air hose can be positioned and installed into the reel apparatus as described above. The reel can be positioned over the body of water by placing the recessed surfaces (58) on the wheels onto the handrail and engaging the bumper (64) against the lower handrail (50). After installation on this adjacent structure, the reel can be moved along the rail to a desired position, and the feed length can be extended to the air controller (36). At the controller, the multiple conduits or air lines (32a–32i) are attached to fittings controlled by the valves (40a–40i). Thus, with the reel apparatus installed as shown in FIG. 1, it is positioned off of the walkway, where it is less likely to interfere with the operator's activities.

The spool can be rotated to the deployed condition, wherein a sufficient length of the supply portion (120) is unwound from the spool to extend to and be connected to various fittings on the pneumatic device (24). As the spool rotates, the hub (74), which is connected to the frame (52), remains fixed in place. Likewise, the feed portion (114) is fixed in place and does not have to twist due to the rotation of the spool, and the slack portion (118) in the storage compartment (112) partially tightens around the hub to accommodate the rotation of the spool. This arrangement lends itself to operation with a single continuous air hose extending between the air controller and the pneumatically powered device, meaning that no intermediate fittings are needed in order to connect several portions of air hose together and or to the reel apparatus. With a continuous hose, the number of leak paths that might be encountered at intermediate fittings is eliminated. Moreover, since the size of the hub can be varied as desired to provide a relatively large area, this arrangement lends itself to the use of air hoses with multiple air lines.

As the spool rotates from the stored to the deployed condition, spring energy is stored in the spring motor (92). Part of the supply portion having a desired length is unwound from the winding surface, and the multiple conduits (32a–32i) or air lines are connected to various fittings (not shown) on the pneumatic tool. Thus, the valves (40a–40i) on the controller (36) can be opened to begin supplying pressurized air to the pneumatic tool (24) without having to completely remove the air hose from the spool. After the operator is finished using the tool, the air hose can be disconnected from the pneumatic tool, and the spool rotated back to a stored condition. As the spool rotates to the stored condition, the spring energy stored in the motor is released to assist in the rotation and the lifting of the support portion (120) as it is pulled upwards and wrapped back onto the spool. Since the reel is positioned above the pool of water and off of the walkway, contaminated water draining off of the supply portion will return to pool.

While the invention has been described with reference to the preceding description, it will be apparent that other variations and modifications may be made therein, and it is intended for the following claims to cover each such variation and modification which falls within the scope and spirit of the invention.

What is claimed is:

1. Apparatus for delivering energy and material selected from the group of electricity, air and fluid from a source to a driven device comprising:

a. at least one continuous, flexible elongated member selected from the group of electric cables, air hoses, and fluid hoses, wherein said elongated member has a feed portion with a feed end connectable to the source, a slack portion, a supply portion with a supply end connectable to the driven device, a first portion between the feed portion and the slack portion, and a second portion between the slack portion and the supply portion; said elongated member comprising multiple conduits;

b. a reel comprising a stationary hub, the hub having a hub support frame comprising a telescoping member with an end disposed radially outwardly of the hub, and a spool connected to said hub, said spool being rotatable, relative to said hub, between a stored condition and a deployed condition;

c. a winding wall on said spool spaced away front hub, having an internal surface and an oppositely disposed winding surface, and an aperture extending therethrough;

d. a storage compartment between said hub and said internal surface;

e. a first clamp on said hub for fixing said first portion in place relative to said hub, positioning said supply portion to extend away from said reel, and positioning said slack portion to extend into said storage compartment;

f. a second clamp on said spool for fixing said second portion in place relative to said spool and positioning the supply portion to extend through said aperture; and g. a force means for moving said spool between the deployed and stored conditions;

whereby, when said elongated member is on the apparatus with said spool in the stored condition said feed portion can extend to and be connected to the source, said slack portion is positioned in said storage compartment, and said supply portion is wound onto said winding surface, and when said spool is rotated to the deployed condition, said feed portion can remain connected to the source, said slack portion partially tightens around the hub while remaining in said storage compartment, and at least a part of said supply portion unwinds from said winding surface a sufficient distance to connect said supply end to the driven device.

2. Apparatus as claimed in claim 1, wherein said force means stores spring energy when said spool is moved from the stored condition to the deployed condition, and releases the spring energy when the spool is moved from the deployed condition to the stored condition.

3. Apparatus as claimed in claim 1, wherein said frame has an upper portion containing a recess therein for removably connecting the apparatus to an adjacent structure.

4. Apparatus for delivering energy and material selected from the group of electricity, air and fluid from a source to a driven device comprising:

a. at least one flexible elongated member selected from the group off electric cables, air hoses, and fluid hoses, wherein said elongated member has a feed portion with a feed end connectable to the source, a slack portion, a supply portion with a supply end connectable to the driven device, a first portion between the feed portion and the slack portion, and a second portion between the slack portion and the supply portion; said elongated member comprising multiple conduits;

b. a reel comprising a stationary hub and a spool connected to said hub, said spool being rotatable, relative to said hub, between a stored condition and a deployed condition; said reel having an upper portion containing a recess therein for removably connecting the apparatus to an adjacent structure; said recess comprising wheels for engaging the adjacent structure;

c. a winding wall on said spool spaced away from said hub, having an internal surface and an oppositely disposed winding surface, and an aperture extending therethrough;

d. a storage compartment between said hub and said internal surface;

e. a first clamp on said hub for fixing said first portion in place relative to said hub, positioning said supply portion to extend away from said reel, and positioning said slack portion to extend into said storage compartment;

f. a second clamp on said spool for fixing said second portion in place relative to said spool and positioning the supply portion to extend through said aperture; and g. a force means for moving said spool between the deployed and stored conditions;

whereby, when said elongated member is on the apparatus with said spool in the stored condition said feed portion can extend to and be connected to the source, said slack portion is positioned in said storage compartment, and said supply portion is wound onto said winding surface, and when said spool is rotated to the deployed condition, said feed portion can remain connected to the source, said slack portion partially tightens around the hub while remaining in said storage compartment, and at least a part of said supply portion unwinds from said winding surface a sufficient distance to connect said supply end to the driven device.

5. Apparatus as claimed in claim 4, wherein said reel includes a lower portion with a bumper thereon for engaging the adjacent structure.

6. Apparatus as claimed in claim 5, wherein said reel includes a moveable member for adjusting a distance between said recess and said bumper.

7. A reel for a hose wherein the hose has a feed portion with a feed end having a length for connecting to a supply device, a slack portion having a length, a supply portion having a length with a supply end for connecting to a driven device, a first portion between the feed length and the slack length, and a second portion between the slack length and the supply length, comprising:

a. a stationary hub and a spool connected to said hub, said spool being rotatable relative to said hub between a stored condition and a deployed condition, said hub having a frame thereon, said frame having an upper portion with a recess therein for removably connecting the reel to an adjacent structure, said recess comprising wheels for engaging the adjacent structure;

b. a winding wall on said spool spaced away from said hub, having an internal surface and an oppositely disposed winding surface, an aperture extending therethrough, and a means for holding the supply portion on said winding surface;

c. said hub having an external surface facing said internal surface, defining a storage compartment therebetween;

d. said hub having a first clamp means, wherein when the first portion is installed in said first clamp means, the first portion is fixed in place relative to said hub, the supply portion is positioned to extend away from said reel, and the slack portion extends towards said storage compartment;

e. said spool having a second clamp means, wherein when the second portion of a hose is installed in said second clamp means, said second portion is fixed in place relative to said spool and the supply portion extends through said aperture and into a pool of water; and f. a force means for moving said spool between the deployed and the stored condition, wherein said force means stores energy when said spool is moved from the stored to the deployed condition and releases energy when the spool is moved from the deployed to the stored condition;

whereby, when the hose is on the reel and the spool is in the stored condition, the feed portion can extend away from the reel so that it can be connected to the supply device, the slack portion is positioned in said storage compartment, and the supply portion is wound onto said winding surface, and when said spool is moved to the deployed condition, the supply portion is at least partially unwound from said winding surface a sufficient distance to connect said supply end to the driven device.

8. A reel as claimed in claim 7, wherein said frame includes a lower portion with a bumper thereon for engaging the adjacent structure.

9. A reel as claimed in claim 8, wherein said frame includes a moveable member for adjusting a distance between said recess and said bumper.

* * * * *